Aug. 30, 1955 R. G. TARR 2,716,385
AUTOMATIC DISPENSER FOR ICE CREAM BALLS OR THE LIKE
Filed Aug. 27, 1949 3 Sheets-Sheet 1
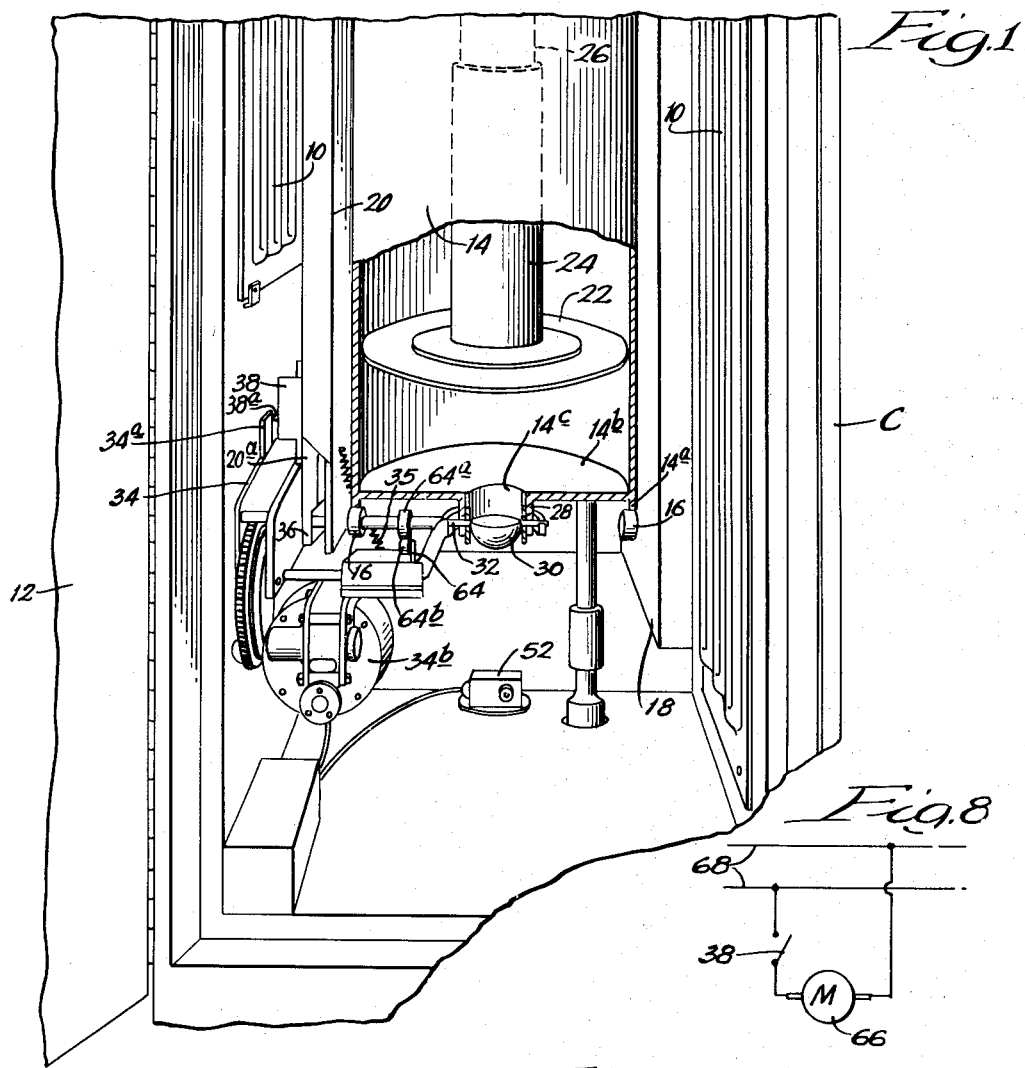
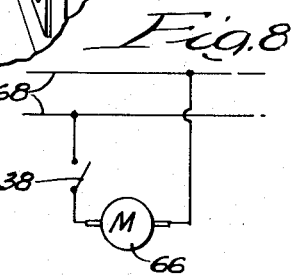
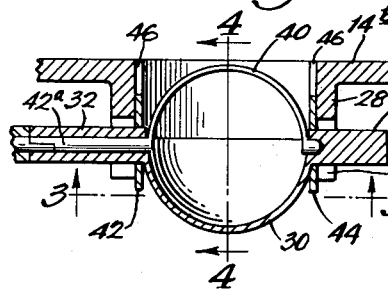
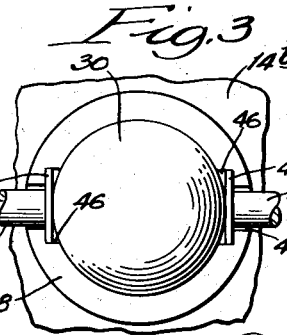
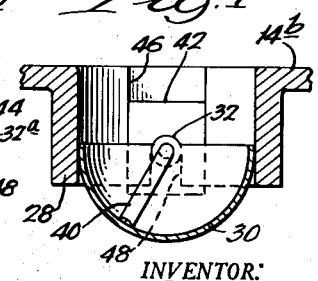
INVENTOR:
Robert G. Tarr.
BY Dawson, Ooms, Booth and Spangenberg,
ATTORNEYS.

Aug. 30, 1955 R. G. TARR 2,716,385
AUTOMATIC DISPENSER FOR ICE CREAM BALLS OR THE LIKE
Filed Aug. 27, 1949 3 Sheets-Sheet 2
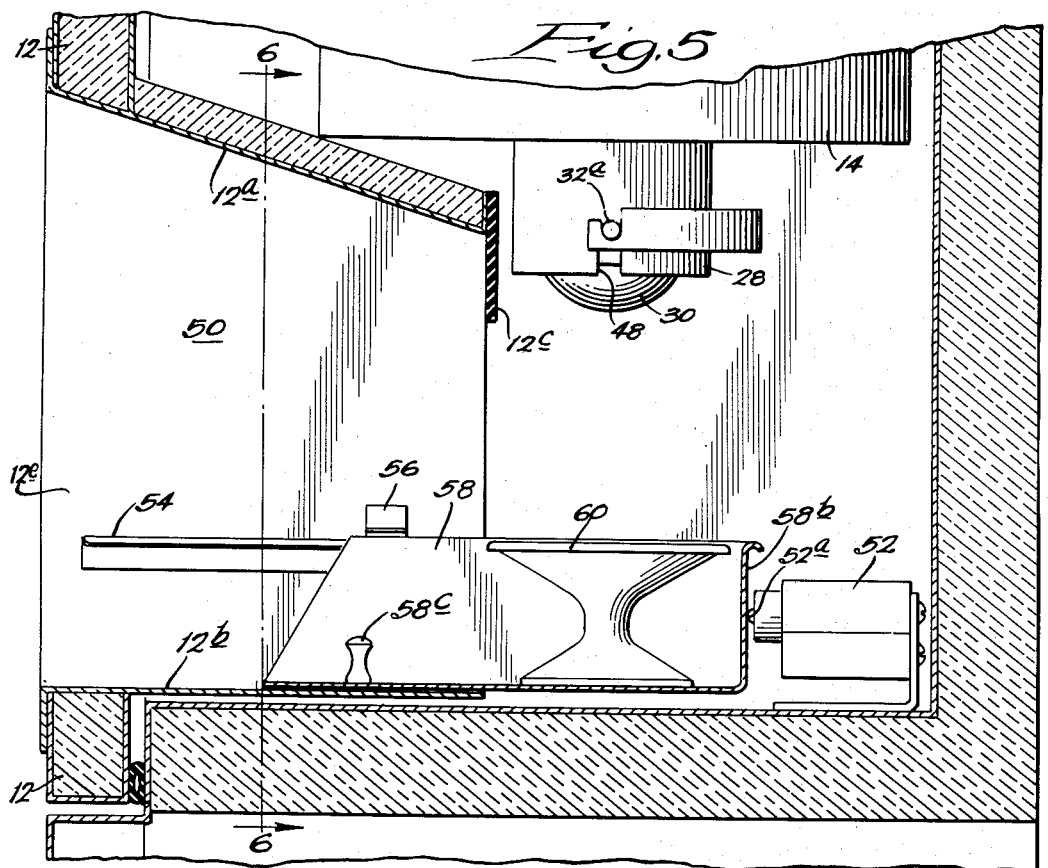
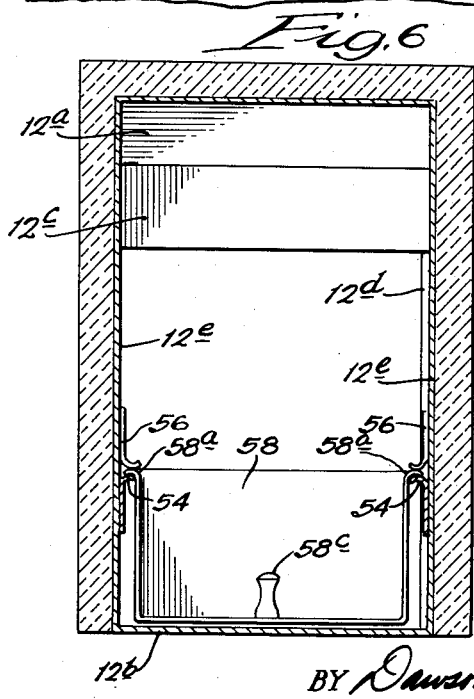
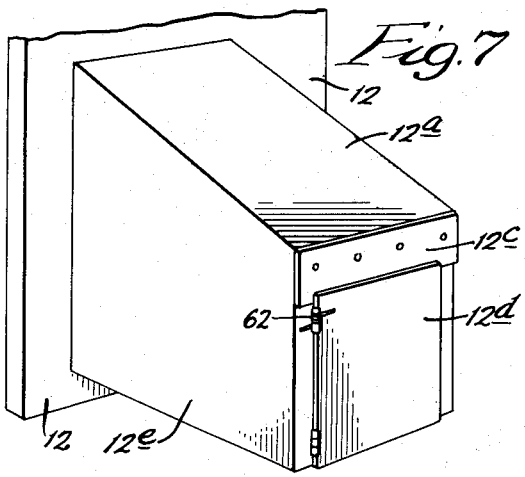
INVENTOR:
Robert G. Tarr,
BY Dawson, Ooms, Booth and Spangenberg,
ATTORNEYS.

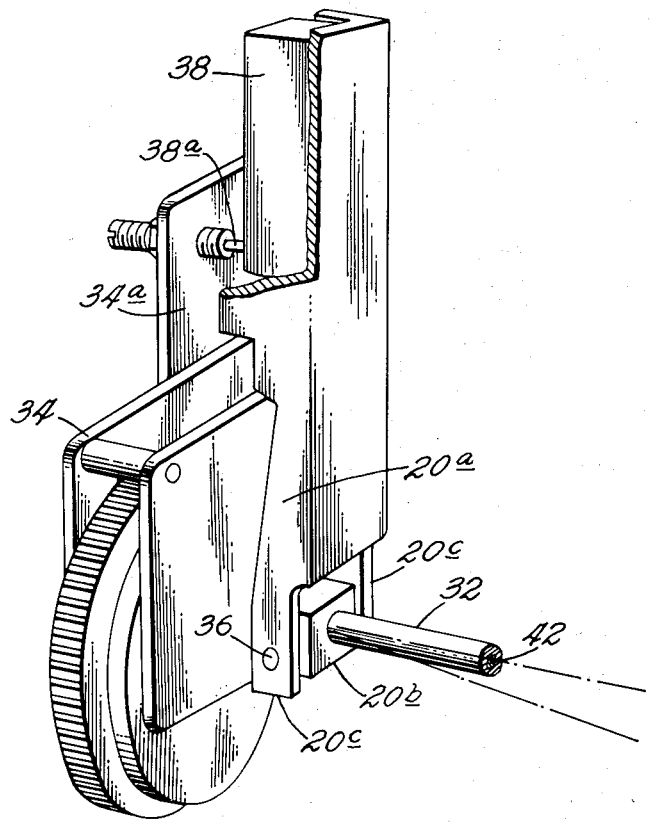

United States Patent Office 2,716,385
Patented Aug. 30, 1955

2,716,385
AUTOMATIC DISPENSER FOR ICE CREAM BALLS OR THE LIKE

Robert G. Tarr, Villa Park, Ill.

Application August 27, 1949, Serial No. 112,725

7 Claims. (Cl. 107—8)

My invention relates to an improved automatic dispenser for ice cream or the like wherein the ice cream balls are formed without exposure to the refrigerated space, ice cream leakage is avoided, ice cream pressure is maintained with a minimum complexity of parts, and the ice cream balls are deposited on a suitable slidable tray.

Structures shown and described but not claimed herein are described in my copending patent applications entitled Ice Cream Cone Dispenser, S. N. 81,120, filed March 12, 1949, and Mechanism for Making and depositing Ice Cream Balls or the Like, S. N. 105,222, filed July 16, 1949, now Patent No. 2,638,065, dated May 12, 1953.

In my prior patent applications there is shown and described an improved automatic device to form balls of ice cream or the like. Briefly this mechanism includes a cabinet defining a refrigerated space and enclosing a container for ice cream having an outlet tube. An ice cream cup is positioned below the outlet tube and rotates to form ice cream balls. In this mechanism it is particularly important to avoid spillage of ice cream from the ice cream ball forming elements. Such spillage creates an unattractive unsanitary condition demanding attention of an operator. This is highly undesirable, since one of the chief advantages of the mechanism lies in its ability to operate without attention.

Moreover, it is highly desirable in an ice cream ball forming machine to utilize a simple and inexpensive control mechanism. Maintenance is expensive and difficult and detracts from the value of the machine. In accordance with the present invention, the control circuits are made more simple and reversals of the pressure creating mechanism are avoided by taking advantage of a heretofore unobserved characteristic of the ice cream.

The present invention further provides a slidable serving tray adapted to receive an ice cream serving cup and operable when inserted into the refrigerated cabinet to energize the ice cream ball forming elements to deposit a ball of ice cream in the serving cup.

It is therefore an object of the present invention to provide an improved ice cream ball forming machine wherein spillage of ice cream is minimized.

Another object of the present invention is to provide an improved ice cream ball forming machine wherein the ice cream is not exposed to the refrigerated atomsphere.

Further it is an object of the present invention to provide an improved ice cream ball forming machine having an automatic mechanism characterized by a high degree of simplicity.

Another object of the present invention is to provide an improved mechanism to force ice cream through an outlet tube to form a plurality of ice cream balls wherein retracting movements of the pressure creating mechanism are unnecessary.

Still another object of the present invention is to provide an improved ice cream ball forming and dispensing mechanism wherein an ice cream ball is automatically deposited on a serving dish disposed on a suitable tray.

Yet another object of the present invention is to provide an ice cream ball forming mechanism that operates in response to insertion of a slidable serving tray.

The novel features which I believe to be characteristic of my invention are set forth with particularity in the appended claims. My invention itself, both as to its organization and method of operation, together with further objects and advantages thereof, will be best understood by reference to the following description taken in connection with the accompanying drawing, in which:

Figure 1 is a view in perspective of the interior of an ice cream ball forming mechanism constructed in accordance with the present invention, with parts in axial cross-section;

Figure 2 is an enlarged fragmentary cross-sectional view of the outlet tube of the mechanism of Figure 1 and the ice cream cup disposed therein;

Figures 3 and 4 are cross-sectional views through axes 3—3 and 4—4, Figure 2, respectively;

Figure 5 is a fragmentary enlarged cross-sectional view of the refrigerated cabinet of Figure 1 showing the serving tray mechanism;

Figure 6 is a cross-sectional view through the axis 6—6, Figure 5;

Figure 7 is an enlarged rear view in perspective of the recessed portion of the refrigerated cabinet and the access door provided therein;

Figure 8 is a schematic circuit diagram of the automatic ice cream ball forming mechanism of Figure 1; and Figure 9 is an enlraged and detail perspective view of a portion of the device showing the support for pivotally mounting the carriage.

Referring now to Figure 1, there is shown at C a refrigerated cabinet defining a refrigerated space to receive the ice cream ball forming elements. Cold plates 10, one located on each side of the cabinet, carry cool refrigerant from a refrigerating mechanism (not shown) to maintain a predetermined cool temperature in the refrigerated space. An access door 12 is secured to the front of the refrigerated space to close the same and at the same time permit access thereto.

A cylindrical ice cream container 14 is disposed centrally within the refrigerated space. The container is supported by the trunnions 16. These trunnions are formed integrally with the depending support plates 18 and 20 carried by the top wall of the refrigerated chamber (not shown). The lower annular flange 14a of the container 14 has a pair of opposed circular grooves to meet with and be received upon the trunnions 16. Straps (not shown) are provided releasably to secure the container 14 in the upright position.

A piston 22 is disposed within the container 14 to urge ice cream therein in the downward direction. This piston is affixed to the interiorly threaded hollow depending post 24 which is in threaded engagement with the upper post 26. A motor (not shown) is provided to lift post 26 relative to post 24 to telescope the two together. When operated in the opposite direction, this motor forces the piston downwardly to exert pressure on ice cream in the container 14.

As will be described in further detail hereafter, automatic elements are provided to energize the motor to drive the piston 22 downwardly. Upward movements of the piston are manually controlled.

The bottom end of container 14 is closed by the bottom plate 14b having a central circular opening 14c. The plate 14b has a depending flange 28 adjacent the opening 14c to define an outlet tube through which the ice cream is extruded under pressure from the piston 22. The ice cream passes through the tube to the cup 30 to form the bottom face of a sphere.

A semi-spherical ice cream cup 30, located at the base of the tube 28 and dimensioned snugly to fit the opening, is adapted to be rotated by a supporting shaft 32 which extends laterally through trunnion 16 and connects to the driving mechanism supported in carriage 34. As shown more clearly in Figure 9, the carriage 34 and the cup 30 located at opposite end portions of the shaft 32 are supported for vertical rocking movement by a block 20b carried for rotational movement by a pin 36 journalled between spaced arms 20c depending from a bracket 20a which forms a part of the support plate 20. To the extent limited by grooves 48, which will hereinafter be described, the cup 30 is able to shift up and down within the tube 28 responsive to ice cream pressure thereby to rock the carriage 34 and make or break contact with switch 38, as will hereinafter be explained.

A switch 38 is mounted on the face of plate 20 for actuation by the tilting movements of the carriage 34. The switch is of the pressure sensitive type and establishes an electrical connection when the carriage 34 tilts beyond a predetermined point in response to the pressure of ice cream on cup 30. An upstanding pressure arm 34a is formed on the carriage 34 to engage the pressure pin 38a on switch 38.

An inner circular knife 40, Figure 2, is fitted snugly against the interior of the cup. This knife is driven and supported by the interior shaft 42a. The drive mechanism on carriage 34 imparts oscillating movements to the knife 40 when the cup 30 rotates to pre-cut the ice cream and wipe it free of the cup, thereby avoiding any tendency of the ice cream to stick. This mechanism is described and claimed in my copending patent application entitled Mechanism for Making and Depositing Ice Cream Balls or the Like, S. N. 105,222, filed July 16, 1949, now Patent No. 2,638,065 dated May 12, 1953.

In accordance with the present invention, the container 14 is fully sealed and spillage of ice cream is prevented despite rocking movements of the cup 30 in response to the ice cream pressure. This is accomplished by the shims 42 and 44, one located on each side of the cup 30. Each shim snugly fits over the shaft 32 or its end portion 32a and is of rectangular shape as shown in Figure 4. The interior of the tube 28 is provided with grooves 46 defining vertical tracks to snugly receive the shims.

As shown in Figures 2 and 4, the depending tube portion 28 of the container 14 has a pair of elongated grooves 48 to receive the shaft 32 and its end portion 32a. These grooves permit up and down movements of the cup 30 and the associated rocking movements of the carriage 34. Since these grooves of necessity must be open over at least part of their length, they define openings through which ice cream may be extruded and spilled under the pressure exterted by piston 22. Since the grooves are covered by the shims 42 over the entire length, this spillage is avoided by the structure of the present invention. It will be observed that the shims 42 and 44 extend on both sides of the grooves 48 to encompass these grooves.

The sealing effect achieved by the shims 42 and 44 is advantageous for the further reason that it prevents any exposure of the ice cream in container 14 to the atmosphere of the refrigerated space. I have discovered that when such exposure exists and lasts for a substantial period of time the ice cream becomes very tough and leather-like in consistency with the consequent unattractiveness to the eater. By avoiding all such exposure, I prevent this occurrence.

The ice cream cup 30 itself defines a nearly perfect seal to prevent toughening of the ice cream. However, the shims 42 and 44 make an even more impervious seal and reduce this tendency still further.

While I am not certain of the reason why the ice cream toughens when exposed to the refrigerated atmosphere, it is my theory that the effect is due to dehydration of the ice cream due to the low relative humidity of the air as it passes over the cup and adjacent portions of the mechanism.

In accordance with another feature of the present invention, the ice cream balls are dropped on a serving dish placed on a slidable serving tray that automatically actuates the mechanism when inserted therein. As shown in Figure 5, the door 12 has a recessed portion, indicated generally at 50, defined by the sloping roof 12a, the flat floor 12b and the back panel 12c having a spring biased door 12d (Figure 7). As shown in the figures, the recess 50 is positioned adjacent the ice cream cup 30 so that the door 12d, when opened, permits access to the space beneath the cup where ice cream balls are released.

A pressure sensitive actuating switch 52 having a striking pin 52a is disposed adjacent the back wall of the refrigerated chamber in the region opposite door 12d. When the pin 52a is depressed, it establishes an electrical circuit to form one ice cream ball and release the same from the cup 30. These circuits are described in further detail hereafter.

The side walls 12e of the recessed portion 50 of the cabinet carry a pair of aligned rails 54. A pair of mating upper rails 56 are positioned above rails 54 as shown. A tray 58 has overhanging side portions 58a to mate with and be received upon the rails 54 as shown so that the tray may be slidably moved into and out of the refrigerated space. At its back end the tray 58 terminates in a solid rear wall 58b that engages and depresses switch 52 when the tray 58 is in the inserted position shown in Figure 5.

The serving tray 58 is adapted to receive a serving dish or cup 60, as shown in Figure 5. When the tray is fully inserted, this cup is below the cup 30 and receives the ice cream ball formed by action of the mechanism in response to actuation of the switch 52.

A handle 58c is provided on the tray 58 to facilitate movement of the same.

The door 12d which receives the serving tray 58 is designed to close when the tray is withdrawn. This is achieved by the use of the spring biased hinge 62 which urges the door to the closed position. This prevents entrance of hot air to the refrigerated space when the drawer is withdrawn.

Electrical circuits

The cup 30 is rotated to form an ice cream ball from the motor 34b carried by carriage 34. This motor is energized by two independent circuits, one including the switch 52 and the other including the cam operated switch 64, Figure 1. The latter switch is operably connected to the cam 64a, Figure 1, by the cam follower arm 64b. The structure of the cam and switch is such as to energize motor 34b except when the cup 30 is in the upright position shown in Figure 1 of the drawing.

The pressure switch 52 is of the type wherein an electrical circuit is established momentarily after the pin 52a is depressed. This time period is sufficient to energize motor 34b until the switch 64 closes to carry the cup 30 around for a full rotation. Thus an ice cream ball is formed each time the switch 52 is actuated by insertion of drawer 58.

In accordance with the present invention, the motor drive for the piston 22 is energized directly from the switch 38 as shown in Figure 8. As indicated, the drive motor 66 is connected to the power lines 68 through the switch 38. When this switch is closed, the motor is energized to drive the piston 22 downwardly and thus pressurize the ice cream.

The friction and lost motion inherent in the rocking movements of the carriage 34, together with the friction and lost motion in switch 38, define a pressure band within which the pressure on the ice cream is held. When the pressure drops sufficiently to cause the switch 38 to close, the motor 66 is energized until the pressure reaches the greater value necessary to open the switch. In other words, the motor drive for the piston 22 is energized when the carriage 34 and cup 30 are rocked to a first position of tilt in response to loss of ice cream pressure, and the motor drive is deenergized when the cup and carriage are rocked to a second tilted position by the ice cream pressure.

If desired, the width of the permissible pressure band can be increased by introducing lost motion in the system. However, I have found that the lost motion inherent in commercial pressure sensitive switches is adequate.

The carriage 34 is biased against the ice cream pressure by the spring 35. This spring tilts the carriage in direction to cause cup 30 to pass up into the tube 28. It is hooked at its upper end to the plate 20 and at its lower end to the carriage 34.

It would seem that the pressure exerted on the ice cream by a given movement of the piston 22 would soon be lost, especially after ice cream balls are formed. It would be expected that as a consequence, the motor 66 would have a heavy duty cycle and be going on and off frequently. Contrary to expectation this does not occur. Instead the motor 66 only operates after long time intervals, even when ice cream balls are being formed at a fast rate. Without any special effort to provide a wide pressure band, I have found it possible to form five or six ice cream balls between successive operations of the motor 66.

In accordance with the present invention the pressure differential between the low pressure limit at which the motor 66 is energized and the high pressure limit where it is deenergized is made sufficient to permit formation of a plurality of ice cream balls. If the components used in the mechanism do not in themselves inherently provide this wide a differential, additional lost motion or friction may be deliberately used.

The unexpected property of ice cream for holding pressure is believed to be due to the presence of air bubbles in the ice cream. These bubbles are believed to impart to the ice cream the compressibility of a gas while at the same time not influencing the ability of the ice cream to be held by the enclosure defined by the container 14, piston 22, and cup 30.

By energizing the motor 66, Figure 8, directly in response to the ice cream pressure, I overcome any need to interrelate the operating mchanism for the cup 30 and the drive mechanism for the piston 22. This is highly desirable for the simple independent series circuit shown in Figure 8 is substituted for the more complex circuit otherwise required and, in addition, it is unnecessary to operate the motor 66 each time an ice cream ball is formed. These advantages reduce the duty cycle on motor 66 and simplify repairs of the mechanism if repairs become necessary.

While I have shown and described a specific embodiment of my invention, it will, of course, be understood that many variations and alternative constructions may be made without departing from the true spirit and scope thereof. I intend by the appended claims to cover all such variations and alternative constructions falling within the true spirit and scope of my invention.

What I claim as new and desire to secure by Letters Patent of the United States is:

1. In an automatic dispenser for balls of ice cream or the like, the combination of a cylindrical ice cream container having an outlet tube, an ice cream cup snugly fitted in said outlet tube, means supporting said cup for movements in response to pressure of ice cream in said tube, means biasing said cup against the pressure of ice cream in said tube, a plunger in said container, means operable in response to a predetermined movement of said cup against the ice cream pressure to move said plunger towards said tube and rsponsive to a predetermined movement of said cup with the ice cream pressure to discontinue movements of said plunger.

2. In an automatic dispenser for ice cream or the like, an ice cream container having an outlet tube with an elongate slot beginning at the bottom of the tube and extending partially upwardly therethrough and a groove formed in the inner wall of the tube in alignment with said slot, a shaft extending through said slot for vertical shifting movement therein, a semi-spherical ice cream cup on said shaft mounted for rotatable movement within said tube, and a sealing plate on said shaft positioned between said cup and said slot and slidable within said groove to seal the interior of the tube, a movable carriage supporting said shaft, and means responsive to movement of said shaft and said carriage to urge ice cream through said container into said tube.

3. In an automatic dispenser for ice cream or the like, the combination of an ice cream container having an outlet tube, means operable to exert pressure on said ice cream in the container to force it through the container and into the tube, a semi-spherical ice cream cup mounted within said tube and shiftable between an inner and an outer position of adjustment, means constantly urging said cup towards its inner position of adjustment within said tube, and means for rendering said pressure exerting means operative when said cup remains in its inner position of adjustment whereby ice cream is forced through the container into said cup and the cup is caused to shift to its outer position of adjustment responsive to such pressure, and for de-energizing said means when said cup is in its outer position of adjustment.

4. In an automatic dispenser for ice cream, the combination of an ice cream container having an outlet tube at one end, an ice cream cup within said tube and mounted for shifting movement between two positions of adjustment responsive to the buildup and loss of pressure respectively on the ice cream for filling said cup, means for building up pressure in said ice cream container, and means responsive to the position of said cup upon loss of pressure on the ice cream for rendering said pressure generating means operative.

5. In an automatic dispenser for ice cream, the combination of an ice cream container having an outlet tube at one end, an ice cream cup in said outlet tube and mounted for shifting movement between a normal pressure position wherein sufficient pressure is present to permit formation of a plurality of balls of ice cream and a minimum pressure position wherein the pressure in the container is insufficient for filling the cup, means for building up pressure in said ice cream container, and means responsive to the position of said cup for rendering said pressure generating means operative when the cup is in minimum pressure position and for rendering said pressure generating means inoperative when in normal pressure position.

6. In an automatic dispenser for ice cream or the like, means defining an ice cream container having an outlet tube with an elongate shaft receiving slot beginning at the bottom of the tube and extending upwardly and a groove in alignment with said slot in the inner wall of said tube for slidably receiving a shim, a shaft extending through said slot and vertically shiftable therein, a semi-spherical ice cream cup on said shaft for rotational movement therewith, said cup fitting snugly within said tube, and a shim snugly fitted about said shaft and slidable in said groove to seal the interior of the tube from the slot.

7. In an automatic dispenser for ice cream and the like frozen confections, a refrigerated cabinet, means within the cabinet to form and release ice cream balls at a predetermined point, a door movable between a normally closed position and open position for access to the interior of said cabinet, a movable tray shiftable through said door into position beneath the means of forming and releasing the ice cream balls, switch means in the path of said tray within the housing and operable to energize said means for forming and releasing ice cream balls in response to movement of the tray into position to receive the ball of ice cream.

References Cited in the file of this patent

UNITED STATES PATENTS

| | | |
|---|---|---|
| 1,351,903 | Hara | Sept. 7, 1920 |
| 1,412,727 | Walsh | Apr. 11, 1922 |
| 1,544,802 | Burkeman | July 7, 1925 |